(12) United States Patent
Bergstrom et al.

(10) Patent No.: US 8,070,958 B2
(45) Date of Patent: Dec. 6, 2011

(54) SEPARATION MATRIX HAVING A LIGAND DENSITY GRADIENT

(75) Inventors: Jan Bergstrom, Uppsala (SE); Gunnar Glad, Uppsala (SE); Bo-Lennart Johansson, Uppsala (SE); Anders Ljunglof, Uppsala (SE); Jean-Luc Maloisel, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 0 days.

(21) Appl. No.: 12/692,671

(22) Filed: Jan. 25, 2010

(65) Prior Publication Data

US 2010/0130354 A1 May 27, 2010

Related U.S. Application Data

(62) Division of application No. 10/575,945, filed as application No. PCT/SE2004/001583 on Nov. 1, 2004, now abandoned.

(30) Foreign Application Priority Data

Oct. 31, 2003 (SE) ...................................... 0302911

(51) Int. Cl.
  *B01D 15/08* (2006.01)
  *C02F 1/28* (2006.01)
(52) U.S. Cl. ..................................... 210/656; 210/198.2
(58) Field of Classification Search .................. None
  See application file for complete search history.

(56) References Cited

U.S. PATENT DOCUMENTS

| 3,983,299 A | 9/1976 | Regnier |
| 5,561,097 A | 10/1996 | Gleason et al. |
| 5,945,520 A | 8/1999 | Burton et al. |
| 5,977,345 A | 11/1999 | Velander et al. |
| 6,090,288 A | 7/2000 | Berglund et al. |
| 6,258,548 B1 | 7/2001 | Buck |
| 6,426,315 B1 | 7/2002 | Bergstrom et al. |
| 6,528,322 B1 | 3/2003 | Carlsson et al. |

FOREIGN PATENT DOCUMENTS

WO  WO 02/071048  9/2002

OTHER PUBLICATIONS

Li et al. A direct comparison of the mixing efficiency in solid-phase organic synthesis by single bead IR and fluorescence spectroscopy. Tetrahedron Letters, vol. 38, No. 37 (1997) pp. 6485-6488.*
Arshady, R., Chimica e L'Industria, 70(9), 70-75 (1988).
Hjerten, S., Biochim Biophys Acta, 79(2), 393-398 (1964).

* cited by examiner

*Primary Examiner* — Vickie Kim
*Assistant Examiner* — Katherine Zalasky

(57) ABSTRACT

The present invention relates to a separation matrix comprised of ligands coupled to the surfaces of a porous support, such as one or more porous particles, wherein the ligands provide at least one chemical gradient within the support. In the most advantageous embodiment, the chemical gradient is a ligand density gradient. The invention also relates to a method of providing a separation matrix comprising ligands coupled to the surfaces of a porous support, in which method at least one ligand density gradient is provided by solvent-controlled diffusion of at least one reagent into the porous support.

7 Claims, 8 Drawing Sheets

SEPARATION MATRIX HAVING A LIGAND DENSITY GRADIENT

CROSS-REFERENCE TO RELATED APPLICATIONS

This application is a divisional of U.S. patent application Ser. No. 10/575,945 filed Apr. 13, 2006, now abandoned, which is a filing under 35 U.S.C. §371 and claims priority to international patent application number PCT/SE2004/001583 filed Nov. 1, 2004, published on May 12, 2005, as WO 2005/042131, which claims priority to patent application number 0302911-3 filed in Sweden on Oct. 31, 2003.

FIELD OF THE INVENTION

The present invention relates to a novel separation matrix for isolation of target molecules, such as proteins, from a liquid. The invention also encompasses a method of preparing such a matrix as well as a chromatography column packed with such as separation matrix.

BACKGROUND OF THE INVENTION

Biotechnological methods are used to an increasing extent in the production of proteins, peptides, nucleic acids and other biological compounds, for research purposes as well as in order to prepare novel kinds of drugs. Due to its versatility and sensitivity to the compounds, chromatography is often the preferred purification method in this context. The term chromatography embraces a family of closely related separation methods, which are all based on the principle that two mutually immiscible phases are brought into contact. More specifically, the target compound is introduced into a mobile phase, which is contacted with a stationary phase. The target compound will then undergo a series of interactions between the stationary and mobile phases as it is being carried through the system by the mobile phase. The interactions exploit differences in the physical or chemical properties of the components in the sample.

In liquid chromatography, the target compound is present in a liquid together with one or more contaminants or undesired substances. Said liquid is contacted with a stationary phase, known as a matrix, which is commonly comprised of either a collection of homogenous, porous or non-porous particles or a monolith of organic or inorganic origin. The properties of the separation matrix will in large decide the efficiency obtained when used in a separation process, such as chromatography. Usually, a separation matrix is comprised of a support to which groups capable of interaction with the target and known as ligands have been coupled. Thus, the ligands will impart to the supports the ability to effect the separation, identification, and/or purification of molecules of interest. In the prior art, a number of different techniques for controlling the density of ligands on a support have been suggested, which techniques generally fall into one of the following four categories:

a) Manipulation of reaction conditions which activate the matrix, i.e. which introduce a reactive group which can couple the ligand. This often involves varying the concentration of activating reagents, reaction time, reaction temperature, pH, or combinations of these variables. Thus, the efficiency of the reaction, i.e. the extent of desired reaction as opposed to competing side reactions, will be strongly influenced by reaction conditions.

b) Manipulation of reaction conditions during the actual coupling of the ligand to the support. This may involve varying the concentration and/or the total amount of ligand the support is challenged with, ionic strength of the coupling buffer, and type of salt in the coupling buffer as well as the variables of time, temperature, pH, etc., mentioned above. Similarly to the technology described above, due to the strong influence of the reaction conditions, this method may also prove difficult to apply in a practical and reproducible manner.

c) Manipulation of the amount of reactive or activatable groups incorporated into the support by varying composition at the time of its formation. For a polymeric support, this would include varying the nature and/or amount of monomer during the polymerisation. Obviously, one should subsequently apply the techniques of a and/or b above in a second step to couple the ligand.

d) For polymeric ligands, manipulation of the amount of ligand incorporated into the polymer by preparation of a polymerisable ligand monomer and varying the concentration of this monomer in the monomer feed during polymerisation. A drawback with this technology is that many ligands useful for chromatographic separations contain functional groups which are incompatible with the conditions necessary for formation of the desired polymer, such as by being unstable under the contemplated polymerisation conditions or by interfering with the polymerisation reaction.

A different method of controlling the density of ligands on a support was suggested in U.S. Pat. No. 5,561,097 (Gleason et al.), which relates to a method of providing an optimised ligand density on a polymeric support, which method is stated to be obtained in a practical and reproducible manner. This can be achieved by a method comprising a step of reacting ligand and a quencher molecule with activated sites on an azlactone functional support under conditions that promote competition of ligand with quencher for the activated sites. One advantage presented is that the method is a single step procedure, without any need of a separate step to activate or deactivate reaction sites on the support. The method disclosed is stated to be especially advantageous for the coupling of small molecules. A disadvantage of this method is that in order not to favour ligand over quencher, an understanding of the reaction kinetics for ligand and reaction kinetics for quencher will be required, including the rate constant for coupling, the concentration of ligand, the nucleophilicity of ligand and quencher, etc.

Further, in biotechnological preparation of target molecules such as proteins, it is well known that to enable an efficient purification thereof, a series of two or more process steps utilising different kinds of separation matrices is often required. U.S. Pat. No. 6,426,315 (Bergström et al.) suggests to replace such a series of steps by using a multifunctional porous separation matrix, i.e. to present the different kind of matrices on a single separation matrix. More specifically, U.S. Pat. No. 6,426,315 relates to a process for preparing such multifunctional porous separation matrices by introducing different functionalities in different layers of the matrix. In brief, the process includes contacting a separation matrix that comprises reactive groups with a reagent, the amount of which is not sufficient for reaction with all groups present in the matrix, and wherein the reaction between the reagent and said reactive groups is rapid compared to the mass transport of the reagent within the matrix. The reactive groups may e.g. be hydroxyl groups, double bonds etc, while the reagent may be a compound that introduces a desired functionality within the matrix, directly or indirectly. In the last mentioned case, the reagent is a compound known as an activating agent, such as a halogenating agent, and the desired functionality is then introduced in a subsequent step. The most preferred functionalities are groups that provide desired separation characteristics to the matrix, commonly known as ligands. Alternatively, the functionalities introduced are the degree of crosslinking, the density or the porosity of the matrix. In order to provide further layers, the reactive groups may be further reacted with another reagent. Thus, the method according to U.S. Pat. No. 6,426,315 may exhibit the drawbacks discussed above under a) and b). In addition, even though the teachings of U.S. Pat. No. 6,426,315 enable the construction of a separation matrix which exhibits a multitude of functions, each one of which will provide different properties as regards binding and diffusion in a separation process, there is no guidance in U.S. Pat. No. 6,426,315 with regard to how to manufacture a separation matrix to that provides an optimal mass transport within the matrix. Thus, there is still a need in this field of alternative methods of producing separation matrices with improved such properties.

In U.S. Pat. No. 5,945,520 (Burton et al.), it is stated that a problem with the known kind of multi or mixed mode chromatography matrices that adsorb a target compound via hydrophobic interactions is that binding efficiencies of less hydrophobic targets will be low unless high salt concentrations are used. To avoid such necessary addition of salt, U.S. Pat. No. 5,945,520 suggests a chromatographic resin, which presents an ionisable ligand comprised of an ionisable functionality and a spacer arm, which attaches said functionality to a solid support matrix. The ionisable functionality is partially electrostatically charged at the pH of adsorption of the target compound to the resin, and is either further charged or of opposite charge at the pH of desorption of the compound from the resin. The ionisable functionalities are selected from a specified group of possible functionalities. In one embodiment, the ionisable functional group is derived from either 2-mercapto-1-methylimidazole or (−)phenylpropanolamine and coupled to a density of at least 150 μmol per milliliter of resin. Such a high ligand density is stated to provide a sufficient hydrophobicity to adsorb target compounds without the need of adding excessive amounts of salt to the liquid. Thus, U.S. Pat. No. 5,945,520 discloses multifunctional ligands evenly coupled to a resin, which consequently can be described as a homogenous separation matrix.

U.S. Pat. No. 6,528,322 (Carlsson et al) relates to an analytical method for qualitative, semi-quantitative or quantitative determination of at least two analytes in an aqueous sample by thin layer chromatography (TLC). More specifically, a method is disclosed wherein analytes, such as isoforms, in an aqueous sample are separated in a flow matrix which permits capillary force assisted fluid flow therethrough, especially a planar flow matrix such as a chromatographic membrane. The gist of the invention is stated to be that the separated analytes are eluted from the separation area of the flow matrix in a direction substantially transverse to the separation direction to migrate to a capture zone. Optionally, the separation zone may have a different ligand density or a gradient of ligand densities along the separation direction. Thus, such a density gradient would be parallel to the flow during use. Furthermore, in this embodiment, there will be a single gradient within each membrane.

Finally, U.S. Pat. No. 5,977,345 relates to an inside-out spatial installation method for a bifunctional reagent that crosslinks a polymer matrix. More specifically, this reference relates to an activated matrix, which can accommodate and optimize the spatial installation of affinity ligands while preventing the immobilization of excess ligand in the outer strata of the hydrogel bead.

However, there is a need in this field of novel separation matrices, which avoid one or more of the problems associated with the prior art. For practical and economical reasons, there is a need in this field of separation matrices that provides an improved mass transport of target molecules.

SUMMARY OF THE INVENTION

One aspect of the present invention is to provide a separation matrix, wherein the mass transport properties during adsorption and/or desorption have been improved. This can be achieved by a separation matrix as described in claim 1.

Thus, an aspect of the invention is to provide a separation matrix, which is especially advantageous for use in large-scale purification of a target molecule.

A specific aspect of the present invention is to provide a separation matrix comprised of essentially spherical particles, wherein the mass transport properties differ along the radius of each such particle.

Another aspect of the present invention is a separation matrix, which allows elution of target molecules at an increased efficiency.

A further aspect of the invention is to provide a method of preparing a separation matrix comprised of a porous support, wherein a ligand density gradient is provided. This can be achieved by solvent-controlled diffusion and/or control of the reactivity of ligand during coupling thereof to the support.

Yet a further aspect of the invention is to provide a process of liquid chromatography, wherein the mass transport during adsorption and/or desorption is improved.

Thus, one aspect of the invention is to provide a process of liquid chromatography, wherein the mass transport during adsorption and/or desorption is controllable.

Further aspects and advantages of the present invention will appear from the detailed description that follows.

BRIEF DESCRIPTION OF THE DRAWINGS

FIG. 1 shows a ligand distribution plot of CM SEPHAROSE™ BB with the intensity of $Nd^{3+}$ versus the radial coordinate in the bead. Bead diameter=190 μm. The results show that the intensity is almost the same over the entire diameter of the bead.

FIG. 2 shows a ligand distribution plot of CM negative gradient SEPHAROSE™ BB according to the invention (Example 1), with the intensity of $Nd^{3+}$ versus radial coordinate in the bead(s). Bead diameter (μm)=130 (diamond), 160 (square), 165 (triangle), 170 (circle). A change in intensity of $Nd^{3+}$ versus lateral position appears clearly. The intensity is high at the outer parts of a bead but gradually decreases when going into the middle of the bead, and finally levels off and/or becomes too low to be measured.

FIG. 3 shows a ligand distribution plot of CM negative gradient SEPHAROSE™ BB according to the invention (Example 2), with the intensity of $Nd^{3+}$ versus lateral position in the beads. Bead diameter (μm)=115 (diamond), 130 (square) and triangle). FIG. 3 shows results similar to FIG. 2, but the change in intensity is different in lateral position. For both prototypes different sizes of beads were analyzed. The shape of the ligand distribution curves was relatively similar, indicating that different size of the beads can be chosen for measurement.

FIG. 4 shows a ligand distribution plot of CM positive gradient SEPHAROSE™ BB according to the invention (Example 3), with the intensity of $Nd^{3+}$ versus lateral position in the beads. Bead diameter (μm)=130 (diamond), 155 (square), 175 (triangle).

FIG. 5 shows a ligand distribution plot of CM positive gradient SEPHAROSE™ BB according to the invention (Example 4), with the intensity of $Nd^{3+}$ versus lateral position in the beads. Bead diameter (μm)=130 (diamond), 150 (square), 160 (triangle). FIGS. 4 and 5 show results from the two positive gradient prototypes of CM SEPHAROSE™ BB. In this case, the intensity is low at the outer parts of a bead but increases rather rapidly when going into the middle of the bead, and finally levels off. The prototype in FIG. 4 has a steeper and shorter ligand gradient. As above, the bead size had no effect on the results.

FIG. 7A-H show illustrative examples of chemical gradients provided according to the present invention. FIG. 7A shows a gradient which increases towards the centre of the support, which gradient starts within the support and hence leaves an outer part of the particle without ligands; FIG. 7B shows a gradient which decreases towards the centre of the support; FIG. 7C shows a gradient which reaches a peak value halfway to the centre of the support; FIG. 7D shows a gradient which decreases towards the centre of the support, i.e. where the ligands are present at a higher concentration in the outer part of the support; FIG. 7E shows two gradients of opposite direction within the support; FIG. 7F shows two gradients of the same direction but of different inclination within the support; FIG. 7G illustrates two gradients, one is in the centre of the particle and one surrounding the centre, similar to FIG. 7C; and FIG. 7H shows a support, wherein one ligand or functionality describes a planar curve and the other is a gradient similar to the one described in FIG. 7B. A support having the kind of gradients shown in FIG. 7H can e.g. be obtained by starting from a support material which has already been functionalised with ligand to a constant substitution degree and subsequently applying the method according to the invention to provide a gradient.

DEFINITIONS

Figure 1:
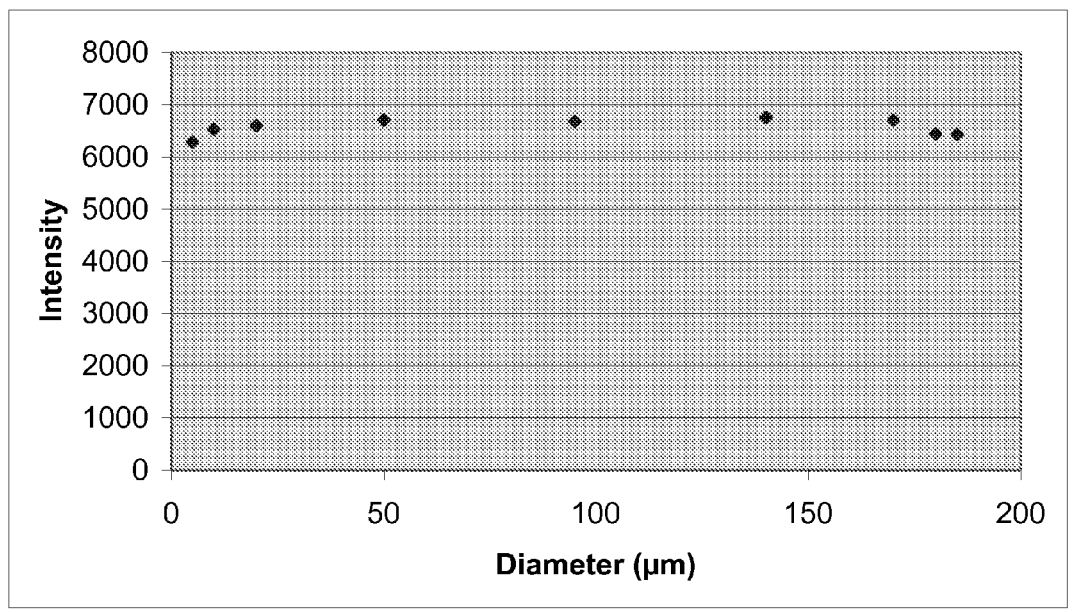
FIG. 1 is a comparative ligand distribution plot of a prior art separation matrix with an even distribution of ligands.

The term "gradient" means a change in the value of a quantity with change in a given variable, especially per unit distance, in a specified direction.

The term a "chemical gradient" means herein that the chemical properties vary in a systematic manner.

The term a "continuous and smooth" gradient means that it increases or decreases in a continuous fashion; linearly or with varying degrees of convexity or concavity. Thus, a "continuous and smooth" gradient is essentially free from discontinuous steps. In the context of essentially spherical particles, a "radial" gradient means that the gradient increases or decreases towards the centre of the beads.

The term "ligand" means a chemical entity, which comprises at least one functional group capable of interaction with a target molecule. The term "functionality" is also used herein for such a functional group. In this context, it is understood that a "ligand" may or may not comprise a spacer element, which distances the functional groups from the surface of a solid support. The term "affinity ligand" means herein a ligand comprising functionalities capable of interaction via biological affinity with a target molecule, such as biotin interacting with streptavidin, an antibody interacting with an antigen etc. In this context, it is to be understood that the term "functionalities" as used herein embraces a number of the same kind of functionalities and a number of different functionalities.

The term "ligand density" means herein the degree of substitution of a support, such as a particle, and is commonly measured in μmol/ml resin.

The "surface" of a porous support refers to the outer surface as well as to the pore surfaces.

DETAILED DESCRIPTION OF THE INVENTION

In a first aspect, the present invention relates to a separation matrix comprised of ligands coupled to the surfaces of a porous support, wherein the ligands provide at least one chemical gradient in the support, which gradient may be directed across the support or be present within the support, depending on its nature. Illustrative shapes of the support are e.g. membranes, monoliths and particles. Thus, in an advantageous embodiment, the present invention is a separation matrix comprised of ligands coupled to the surfaces of at least one porous particle, wherein the ligands provide at least one chemical gradient between the centre and the exterior surface of each porous particle. In this context, it is understood that a chemical gradient means a systematic and repeated change in any chemical property, preferably a property that is utilised in, or influence, a subsequent separation process. Illustrative chemical properties are concentration, density and attraction. The chemical gradient present in the particles according to the invention is preferably created in a way that improves the mass transport when the matrix is utilised for separation, such as in chromatography. Accordingly, even though heterogeneous particles may have been resulted from prior art methods of manufacture, the present invention suggests for the first time heterogeneous particles which have been specifically designed to incorporate a chemical gradient that alters and preferably improves their adsorption and/or desorption properties during a separation process. Illustrative adsorption and/or desorption properties are e.g. capacity, selectivity, efficiency, intraparticle mass transport, rigidity etc.

The separation matrix according to the present invention is useful in separation and/or purification of practically any target molecule or compound, such as in chromatography or membrane separation. Illustrative examples of target molecules are biomolecules, such as proteins; e.g. antibodies; peptides, e.g. oligopeptides and polypeptides; nucleic acids, e.g. DNA, RNA and PNA; cells; plasmids; and virus; and large and small organic molecules, such as organic drug candidates. Another group of target molecules are molecules useful in food products, such as proteins or peptides useful as food additives or the like. Illustrative examples of this kind of target molecules are e.g. molecules isolated from liquids originating from milk or whey products, such as lactoferrin. A process of liquid chromatography utilising the present separation matrix will be discussed in more detail below.

In the most advantageous embodiment of the present separation matrix, the porous particle is an essentially spherical bead. The supports used in the present invention may be made of an inorganic material, such as glass or silica, or an organic material, such as one or more organic polymers. In an advantageous embodiment, the support is made from natural or synthetic polymers.

Thus, in a first embodiment of the support, it comprises one or more carbohydrate material, such as agarose, agar, cellulose, dextran, chitosan, konjac, carrageenan, gellan, alginate etc. In an advantageous embodiment, the support comprises a crosslinked carbohydrate material. Carbohydrate supports are easily prepared according to standard methods, such as inverse suspension gelation (S Hjertén: Biochim Biophys Acta 79(2), 393-398 (1964). Alternatively, the starting materials used to prepare the support of the present invention are commercially available products, such as SEPHAROSE™ FF (obtainable from GE Healthcare Bio-Sciences AB, Uppsala, Sweden).

In a second embodiment of the support, it comprises one or more synthetic polymers, such as styrene or styrene derivatives, divinylbenzene, acrylamides, acrylate esters, methacrylate esters, vinyl esters, vinyl amides etc. In an advantageous embodiment, the support comprises one or more crosslinked synthetic polymers. Such polymers are easily produced according to standard methods; see e.g. "Styrene based polymer supports developed by suspension polymerization" (R Arshady: Chimica e L'Industria 70(9), 70-75 (1988)). Alternatively, a commercially available product, such as SOURCE™ or SEPHACRYL™ (GE Healthcare Bio-Sciences AB, Uppsala, Sweden) can be utilised as starting material to prepare the beads according to the invention.

In a specific embodiment of the support, it is made from one of the above-discussed materials, and in addition it comprises one or more high density fillers. Such fillers may be of any material that presents a suitable density and compatibility with the support material, such as stainless steel. This embodiment is suitable for use in an expanded bed-kind of separation process, where the separation matrix is expanded by a liquid flow applied from below. In this embodiment, the support advantageously comprises essentially spherical particles, either as separate entities in the form of a gel or as aggregates of particles. Expanded bed processes and the properties of suitable separation matrices for use therein are well known in the field of chromatography, and the skilled person can easily prepare this embodiment of the invention based on the teachings of the present invention and common technical knowledge.

In an advantageous embodiment of the present separation matrix, at least one chemical gradient is a ligand density gradient formed by a changing density of ligands on the support. In illustrative embodiments, the separation matrix comprises a single gradient which is a ligand density gradient; one ligand density gradient and one other gradient, as discussed in more detail below; or two ligand density gradients in the same or different direction, optionally combined with one or more other gradients. Thus, in one embodiment, two or more chemical gradients are present in the support and at least gradient is a ligand density gradient.

In an alternative embodiment, at least one chemical gradient is the result of varying pKa values of the functional groups of the ligands present on each porous particle. In yet an alternative embodiment, at least one chemical gradient is the result of a varying net charge of the ligands present on each porous particle. Such gradients can be prepared in methods analogue to the ones described in relation to ligand density gradients, wherein the pKa values and net charge are controlled instead of the density of coupled ligands.

Various methods of preparing gradients according to the invention in a porous support will be described in detail below.

The chemical gradient of the present separation matrix may be of any direction. In one embodiment, the separation matrix comprises a positive gradient, which is directed, and increases, towards the centre of the support. In another embodiment, the separation matrix comprises a negative gradient, which is directed, and decreases, towards the outer surface of the support and consequently decreasing towards the centre. In a specific embodiment, the present separation matrix is a chromatography matrix comprised of a plurality of essentially spherical particles, wherein each particle presents one or more gradient(s) perpendicular to the direction of the liquid flow applied in chromatography. As the skilled person will understand, if the beads are spherical or essentially spherical, there will be gradients in all directions. However, this embodiment clearly differs in terms of direction to e.g. the above discussed U.S. Pat. No. 6,528,322 (Carlsson et al), wherein the direction of flow and the direction of the therein discussed gradient are the same.

Further, as the skilled person in this field will realise, as the mass transport is increased towards the centre of a support, the increasing amount of target molecule in the inner will give rise to a concentration gradient, which then works against the desired direction of mass transport. However, in most cases, such a concentration driven force will be smaller than the driving force into the desired direction. If necessary, the skilled person in this field can take this into consideration when the support is designed and ensure that the attraction force provided by the functional groups is sufficient. In the case of an opposite gradient, such a concentration gradient may instead cooperate with the driving force of the mass transport.

Thus, in an illustrative embodiment of the present separation matrix, a ligand density gradient is designed in porous essentially spherical particles to maximise the mass transport in the outermost part, corresponding to about 40% of the radius. This means that the ligand density increases towards the centre and the slope of the ligand gradient is largest in the outer part of the particles and lowest in the inner part of the particles. The outermost part corresponding to the outer 40% of the particle radius accommodates almost 80% of the total particle volume and protein capacity, respectively. This means that it will not be as important to utilise the capacity in the inner part of the particles. Therefore, the above suggested gradient can also be designed in a way that the slope of the ligand density gradient increases from the outer surface of the particle to about 40% of the radius and then the ligand density will decrease towards zero in the centre of the particles. In a specific embodiment of the present separation matrix, the support is comprised of essentially spherical particles, wherein each particle is comprised of a solid non-porous material surrounded by a porous material as discussed above and wherein at least one chemical gradient has been provided in the porous part. This embodiment may advantageously be used in applications where a high flow rate is desired, since a solid inner part will improve the rigidity of the particle while an efficient separation can be obtained by using only a part of the particle, such as about 40% of the radius, as explained above.

In the most advantageous embodiment of the present separation matrix, at least one chemical gradient is a continuous and smooth gradient. Such gradient(s) may be present only in the outer part of a support, as discussed above. Alternatively, such gradient(s) may not be present only in the inner part of a particle, such as leaving an outer shell of a porous particle wherein there is no gradient. As will be discussed in more detail below, the present separation matrix may comprise two or more chemical gradients, such as one or more continuous and smooth gradients and one or more gradients that comprise discontinuous steps. The skilled person in this field will be able to decide the most advantageous extent of the chemical gradient(s) for each intended purpose, i.e. depending on which separation property it is most desired to alter or improve.

In one embodiment of the present separation matrix, the ligands of each particle provide at least two different functionalities. In one embodiment, said functionalities are selected from the group that consists of cation exchange ligands, anion exchange ligands, hydrophobic interaction chromatography (HIC) ligands, reversed phase chromatography (RPC) ligands, immobilised metal chelating ligands (IMAC), thiophilic ligands, and affinity ligands. Such functionalities are well known to the skilled person in this field and are easily prepared by standard methods, see e.g. Janson and Rydén in Protein Purification: Principles, High Resolution Methods, and Applications (1989 VCH Publishers, Inc).

In a specific embodiment of the present separation matrix, said at least two different functionalities are present on the same ligand. Thus, the ligands may comprise groups that are partly electrostatically charged, or partly electrostatically charged, at the pH of binding of the target molecule to the matrix and either further charged or of an opposite charge at the pH of elution. In an illustrative embodiment, the ligands present zwitterionic functionalities. Thus, in this embodiment, the ligand will comprise two groups that are cationic and anionic, respectively, at a specified pH value. Consequently, the adsorption may then utilise ionic interactions of a first charge, while elution can be provided by a change in pH to provide desorption of the target molecule from the matrix by neutralisation of said first charge and repulsion by ionic interactions of the second charge, which is opposite from the first. Examples of zwitterions are numerous and well known to the skilled person in the art, such as the common amino acids, and may be exemplified e.g. by N-[tris-(hydroxymethyl)methyl]-3-aminopropane sulphonic acid (TAPS), dimethyl glycin and glycin alanine.

In an alternative specific embodiment, said at least two different functionalities are present on different ligand kinds, and each such ligand kind provides a separate chemical gradient within the porous particle. Accordingly, in an illustrative embodiment, the present separation matrix comprises two or more chemical gradients provided by two or more different kind of ligands, such as two ligand density gradients of the same or opposed direction, wherein each ligand kind provides a separate chemical gradient.

As the person skilled in the art will understand, the discussion below will apply equally well to the embodiment where a chemical gradient has been obtained from ligands comprising more than one functionality and to the embodiment using different kinds of ligands. Thus, by combining two different chemical gradients, one for a positive group and the other for a negative group, the present invention allows to increase the mass transport of a target molecule, such as a charged protein, in the outer part (corresponding to about 40% of the radius of an essentially spherical particle) and then prevent the protein to be transported into the centre of the support by charge repulsion.

If positively charged proteins are the target molecules, the gradient of negatively charged ligands is constructed as described above. The slope of the negatively charged ligand gradient increases up to a value corresponding to about 40% of the radius of an essentially spherical particle, and then the ligand density decreases towards zero in the centre of the support. This means that the ligand density is at a maximum value at a value corresponding to about 40% of the radius of an essentially spherical particle. The positively charged ligand gradient may begin at a location corresponding to about 40% of the radius of an essentially spherical particle and increases toward the centre of the support. This gradient is designed in a way so that the positively charged proteins are hindered by charge repulsion to penetrate the centre of the support.

In a second aspect, the present invention relates to a chromatography column packed with a separation matrix comprised of ligands coupled to the surfaces of a porous support, wherein the ligands provide at least one chemical gradient within the support.

In an advantageous embodiment, at least one chemical gradient is a ligand density gradient as described above. In one embodiment, the present chromatography column has been packed with a separation material as described above. The chromatography columns according to the invention may be relatively small and useful for laboratory applications or of a larger size suitable for production of target molecules in large scale. Thus, the column may be used for large scale purification of target molecules; for the removal of one or more undesired molecules from a liquid sample, and for analytical purposes such as diagnostics. The column material and design may be adapted depending on the intended application using standard materials and technologies.

In a third aspect, the present invention relates to a method of providing a separation matrix comprising ligands coupled to the surfaces of a porous support, in which method at least one ligand density gradient is provided by solvent-controlled diffusion of at least one reagent into the porous support. This method is the best embodiment of manufacture of the separation matrix according to the invention. In this context, it is understood that the term "reagent" means any molecule or compound capable of reacting with groups present on the surface of the porous support, and may or may not comprise ligand functionalities, as will be discussed in more detail below. This aspect also embraces the preparation of anyone of the above discussed chemical gradients, such as pKa gradients or net charge gradients. The solvent-controlled diffusion is obtained by adding said reagent(s) from a first solvent while a second solvent is present inside the porous support, said first and second solvents presenting different solubilities. Thus, in one embodiment of the present method, the solvent-controlled diffusion is obtained by contacting a first solvent comprising said reagent(s) with the support, in the pores of which a second solvent is present, said first and second solvents presenting different solubilities. In an illustrative embodiment, the first solvent is aqueous and the second solvent is organic. In an alternative embodiment, the first solvent is organic and the second solvent is aqueous. Thus, the porous support may first be soaked in a suitable solvent, such as an organic solvent, and then drained e.g. by filtration before being contacted with a reagent solution which is not soluble, or which is difficult to solve, in the first solvent, such as an aqueous solution of reagent. Suitable solvent combinations for use in the present method are easily defined by the skilled person in this field.

Even though the diffusion between organic phases and aqueous phases will proceed without further assistance, to assist e.g. to speed up the rate of the present method, the invention also relates to an embodiment wherein one or more further conditions are adjusted to assist the diffusion in the desired direction. As the skilled person in this field will understand, this can be achieved by any of a number of available means, such as one or more conditions selected from the group of temperature; air flow; solvent properties; and concentration(s) and/or nature of the functionalities. Thus, in one embodiment of the present method, the diffusion of reagent(s) is assisted by providing an air flow through the reaction mixture during the ligand coupling. In one embodiment, the air flow is essentially continuous.

The separation matrix prepared according to the present method may be of any of the above-discussed shapes or formats, such as essentially spherical particles, commonly denoted beads, monoliths, filters, membranes etc. The gradients provided may be any of the chemical gradients described above such as ligand density gradients. Any one of the above-discussed shapes and combinations of gradients discussed above may be prepared by the present method.

In one embodiment of the present method, a ligand density gradient that decreases towards the centre of the support is provided by adding a reagent that comprises at least one functionality under diffusion-controlled conditions. This direction of gradient is also denoted a negative gradient. In this context, it is understood that the reagent is any compound that comprises one or more functionalities capable of acting as ligands once coupled to a surface, or useful to provide such functionalities at the surface of the support as discussed below. It is understood that "acting as ligands" refers to the capability of interacting with a target molecule once immobilised or coupled to the surface of the support.

In one embodiment of the present method, the reagent or groups present on the surface of the porous support have been activated. Activation and activatable groups will be discussed in more detail below, and any of the below discussed embodiments and examples are applicable here. Thus, well known coupling chemistry can be used to activate the support into a reactive form and contact it with a suitable reagent, e.g. a reagent comprising hydroxyl groups. Alternatively, the surface groups of the porous support is essentially non-reactive, while the reagent has been activated, e.g. by epoxidation. Thus, any embodiment of this method is covered, wherein the surface groups of the support and the added reagent are capable of reacting with each other. As the skilled person in this field will recognise, there are numerous ways of coupling desired groups to a support of the present kind, and enabling this embodiment of the invention is easy to the skilled person in this field. Reference can be made to any standard textbook in organic chemistry, see also Immobilized Affinity Ligand Techniques, Hermanson et al, Greg T. Hermanson, A. Krishna Mallia and Paul K. Smith, Academic Press, INC, 1992.

Thus, the support presents activatable groups, which are easily activated by conventional chemistry, or activated groups capable of reacting with a reagent. In a specific embodiment, the support presents activated groups. This embodiment is useful especially for the preparation of a gradient that increases towards the middle of the support, i.e. a positive gradient. Thus, in one embodiment, a density gradient that increases towards the centre of the support is provided by adding, in a first step, a first reagent that comprises deactivating groups under diffusion-controlled conditions and, in a second step, adding a second reagent that comprises at least one functionality. Thus, in the first step, a deactivating group is added to obtain surface groups which are deactivated. Thus, after the first step, the deactivated groups on the surface of the support cannot react with the second reagent, and no functional groups with be coupled at these sites. In other words, in this embodiment, the deactivated groups are non-reactive in respect of the second reagent that comprises functionalities. Thus, the first reagent may also be denoted a "deactivating agent". The diffusion is controlled to gradually decrease towards the centre, and hence there will be an increasing capability to couple functional groups and provide ligands towards the further in you get. Since the number of available groups have been controlled by the deactivation step, in the second step, the amount of reagent is not crucial and there will be no need to control diffusion in the second step.

As the skilled person in this field will realise, there are numerous ways of providing one or more gradients by variation of one or more conditions. For example, the amount of functional groups is one useful variable. Furthermore, a mixture of one or more different functional groups is useful. Thus, in one embodiment, the reagent comprises two different functionalities in a predetermined ratio to provide to different ligands in the separation matrix. Different diffusion properties of different functionalities may then result in different chemical reagents.

Further, the second aspect of the present invention also encompasses a method of preparing a separation matrix that comprises ligands coupled to the surfaces of a porous support, which method comprises the step of
(a) providing activatable groups on the surface of a porous support;
(b) activating said groups with an activation agent;
(c) reacting groups activated according to step b) with a compound which comprises at least one functionality;
wherein control of the reactivity in step (c) results in at least one chemical gradient within the support. Alternatively or additionally, the gradient(s) are obtained by controlling the diffusion rate during step (c). The control of step (c) can also be defined as control of the reaction rate. The skilled person in this field can adjust the appropriate parameters to obtain a suitable relationship between reactivity and diffusion. In one embodiment, the reactivity is slightly higher than the diffusion into the support.

The gradients may be generated by using a limiting amount of compound comprising functionalities (ligand) in step (c) as compared to the activated groups resulting from step (b). It is also possible to control other parameters such as the temperature, the concentration of the ligand or the type of solvent to control the diffusion and/or the reactivity of the ligand, creating gradients with different ligand substitution profiles. Using different limiting quantity of ligand can also generates different of gradient profiles. Thus, in one embodiment, the diffusion rate is controlled by adjustment of the concentration of ligand.

The porous support may be as discussed above in relation to the first aspect of the invention. In an advantageous embodiment, the support is comprised of at least one porous particle, preferably an essentially spherical particle, and at least one chemical gradient extends between the centre and the exterior surface of each porous particle. Various general techniques for preparing a porous particle that carries ligands are well known in this field. As is easily realised, the method of choice will depend on the nature of the porous particle.

The activatable groups provided in step (a) may be any groups commonly used in this context, such as carboxylic groups (activatable with NHS/EDC), amines, allyl groups etc. Thus, in an advantageous embodiment of the present method, the activatable groups of step (a) are carbon-carbon double bonds. Thus, the porous support may for example be particles made from a synthetic polymer, wherein double bonds such as vinyl groups left unreacted in the preparation thereof are easily available.

In one embodiment, the present method also comprises to provide the activatable groups present at the surface of at least one porous particle in a step preceding step (a). The allylation is easily performed following standard methods with a suitable agent, such as with allyl glycidyl ether (AGE) or allyl bromide. This may for example include to allylate suitable groups such as hydroxyl groups, which are available in most natural polymers such as polysaccharides, e.g. agarose. However, other activatable groups are well known to the skilled person in this field, and illustrative further examples are e.g. amines, thiols, carboxy groups etc. Accordingly, in one embodiment, the step preceding step (a) comprises to allylate hydroxyl groups present on the surface of a porous support.

In an alternative embodiment, steps (a)-(c) above are replaced by a single step, wherein an activated ligand is reacted with the activatable groups present on the surface of the support. This may for example involve use of a compound, which carries both a reactive group, such as an epoxide, which is available for reaction with the e.g. a hydroxyl group on the surface of the support, and one or more ligand functionalities.

Step (b) can be performed using any commonly used activation agent capable of rendering a carbon-carbon double bond reactive. In one embodiment, the activation agent is a free radical. In another embodiment, the activation agent comprises an electrophile, such as a halogen, e.g. bromine, chlorine or iodine, or a hydroxide thereof. Thus, in one embodiment, the activation agent used in step (b) is a halogen. Activation of a carbon-carbon double bond with a halogen or halogenating agent may result in halohydrines, which are easily converted to reactive epoxy groups in accordance with standard methods. Thus, in a specific embodiment, step (b) also includes to convert the halogenated product to an epoxy group.

As the skilled person in this field will easily realise, in addition to the actual functional group(s), the compound coupled in step (c) may also comprise an element which distances said functional group(s) from the support surface. Such elements are commonly used and known as spacer elements or spacers. Alternatively, a spacer may coupled to the surface of the particle surface before the activation thereof. As is well known, any such distancing element will work as a spacer, regardless of the method for its introduction, and in principle any group or compound that provides such distancing will be denoted a spacer. As appears from the above, some of the more frequently used activating schemes comprise an activating agent such as allyl glycidyl ether (AGE), which in part will be transformed into a spacer.

In one embodiment, at least one chemical gradient is a continuous and smooth ligand density gradient, as discussed above in the context of the first aspect of the invention.

In the most advantageous embodiment of the present method, at least one chemical gradient is a ligand density gradient. The present method may be repeated in order to obtain two or more chemical gradients, as discussed above. In an alternative embodiment, the gradients are obtained more or less simultaneous, in a single process.

In one embodiment of the present method, the functionalities of in step (c) provide at least two different functionalities. Such functionalities may be as described above in the context of the first aspect of the invention. In one embodiment, said at least two different functionalities are present on the same ligand, such as on a zwitterionic compound.

In an alternative embodiment, said at least two different functionalities are present on different ligand kinds, and a separate chemical gradient is provided for each such ligand kind within the support. Such different gradients may be as discussed above in the context of the first aspect of the invention. Thus, in one embodiment, two chemical gradients are provided in the support, one of which is a ligand density gradient. The effects and advantages of such gradients and combinations of gradients will be discussed in more detail below in the context of the process of liquid chromatography.

The present invention also encompasses a separation matrix prepared using the present method.

In a fourth aspect, the present invention relates to a process of liquid chromatography, wherein a liquid comprising a target molecule is contacted with a separation matrix that comprises ligands coupled to the surfaces of a porous support and the ligands provide a chemical gradient within the support. In one embodiment, the support is comprised of at least one porous particle, and a chemical gradient extends between the centre and the exterior surface of each porous particle. Thus, the gradient may be a radial gradient. The nature of the separation matrix may be as described above in the context of the first aspect of the invention. The general principles behind liquid chromatography are well known to the skilled person in this field and described in various textbooks.

In the most advantageous embodiment, the present process further comprises a step of eluting the adsorbed target molecule from the matrix by contacting the matrix with an eluent. The nature of the eluent will obviously depend upon the nature of the ligands coupled to the particles. For example, in case of ionexchange gradient elution, the eluent may comprise a salt gradient or a pH gradient. In a specific embodiment of the present process, the functional groups of the ligands are zwitterions and the elution is performed at a pH different from that used during the adsorption.

In one embodiment, in the separation matrix used in the present process, the ligand density increases towards the centre of the support. Hence, if the particles are essentially spherical beads, this embodiment includes a radial gradient. In an alternative embodiment, the gradient is of the opposite direction. As described above in the context of the first aspect of the invention, the present separation matrix may contain two or more chemical gradients, one of which is preferably a continuous and smooth gradient.

By utilising a separation matrix comprising two different ligand gradients, where each of the two ligands have different chromatographic properties, both the adsorption and the desorption processes can be improved. For example, by choosing one ligand that attracts and one ligand that repels the target molecules, the adsorption can be directed to the outer part of the support and the target molecules are prevented from penetrating the inner part of the support. The gradient of the attracting ligand is adjusted to increase the mass transport of the sample molecules in the outer part of the support.

Another advantage of using two ligands and two different gradients is the possibility to achieve a separation of target molecules in each support, e.g. in each particle, and in this way increase the selectivity of the chromatographic process, such as a separation in a column. This can, for example, be accomplished by combining one gradient of an ion-exchange functionality and another gradient of a functionality that supports hydrophobic interactions, i.e. a HIC ligand. The gradient of the HIC-ligands decreases towards the centre of the particles and the gradient of the ion-exchange ligand increases towards the centre. This means that hydrophilic target molecules, which are oppositely charged to the ion-exchange group, will mainly be adsorbed in the inner part of the particles and the hydrophobic charged sample molecules will be adsorbed in the outer part. When such particles according to the invention are used in column liquid chromatography, the adsorbed target molecules are easily desorbed by gradient elution. To fully take advantage of the protein separation in the particles, the solvent gradient should be designed in a way that the proteins adsorbed in the outer part of the particles are eluted first and the proteins adsorbed in the inner part of the particles are eluted last.

As mentioned above, the present invention is useful for separation of virtually any target molecule, depending on how the separation matrix is designed. In one embodiment, the target molecule is a protein. The present process of liquid chromatography may either be a process of purifying one desired target molecule from a solution, such as a fermentation broth, or a process used for purification of a liquid by removal of an undesired target molecule, such as a virus.

EXAMPLES

The present examples are provided for illustrative purposes only, and shall not be construed as limiting the invention as defined by the appended claims. All references given below and elsewhere in the present application are hereby included herein by reference.

A. General—Preparation of Gradient Beads

Volumes of matrix refer to settled bed volume. For large scale reaction stirring is referring to a suspended, motor-driven stirrer since the use of magnet bar stirrer is prompt to damage the beads. Small-scale reactions (up to 20 ml or g of gel) were performed in closed vials and stirring refers to the use of a shaking table. Conventional methods were used for the analysis of the functionality and the determination of the degree of allylation, or the degree of substitution of ion exchanger groups on the beads.

Introduction of Activatable Groups on the Surface of a Porous Support

A porous support is easily provided with activatable groups using allyl glycidyl ether as follows in this example. 170 ml of SEPHAROSE™ Big Beads (BB) (obtainable from GE Healthcare Bio-Sciences AB, Uppsala, Sweden), were suction dried to 130 g and mixed with a 50% aqueous solution of NaOH, 1.7 g of $NaBH_4$, 21 g of $Na_2SO_4$, and 20 ml of water. The mixture was stirred for 1 hour at 50° C. Allyl glycidyl ether (150 ml) was added and the suspension was left at 50° C. under vigorous stirring for an additional 16 hours. After neutralisation with successive additions of 5M AcOH until a pH of 7 was reached, the mixture was filtered and the gel was washed successively with 1 L ethanol, 2 L distilled water, 400 ml of 0.2 M acetic acid and, 500 ml distilled water. Titration gave 0.316 mmol of allyl/ml of gel.

Activation of Activatable Groups by Bromination

A porous support comprising activatable groups is easily activated as follows in this example. Bromine was added to a stirred suspension of 5 ml of allyl activated SEPHAROSE™ BB (0.316 mmol allyl groups/ml drained gel), 0.5 g of AcONa and 5 ml of distilled water, until a persistent yellow colour was obtained. Sodium formate was then added until the suspension was fully decolourised. The reaction mixture was filtered and the gel washed with 50 ml of distilled water, followed by ethanol and finally toluene. The well drained gel was then directly transferred to a reaction vessel and further reacted with the ligand.

Reacting Activated Groups with a Compound Comprising Functionalities to Form a Gradient The gradients can be conveniently obtained by limiting the diffusion of different reagents in the support using two different solvents in the support and outside. For example, the functionalities, here cationic groups were introduced on the matrix directly via the sulphur atom of the 3-mercaptopropionic acid. Thus, in this case 3-mercaptopropionic acid is the reagent, i.e. the compound that comprises functionalities.

Ligand gradients directed and hence increasing towards the centre of the support are referred here as positive gradients and ligand gradients directed towards the outer surface of the support and consequently decreasing towards the centre are referred as negative gradients.

In the present examples, the coupling to the matrix was realised via bromination of the allyl group and nucleophilic substitution under basic conditions.

B. Examples

Example 1

Negative Gradient Provided in Toluene/Water System (U1282072)

In this example, a separation matrix comprising a density gradient of carboxymethyl (CM) cation-exchange ligands was prepared as follows. A 4 g quantity of bromine activated gel in toluene (0.316 mmol allyl groups/ml drained gel) was filtered and transferred to a reaction vial containing a solution of 3-mercaptopropionic acid (0.07 ml) in water (5 ml) that had been adjusted to pH 11.5 by addition of 2M NaOH (0.8 ml) and 0.5M $Na_2CO_3$ (4 ml). The reaction was left 16 hours under stirring at 50° C. and with a continuous air flow through the mixture (30 ml/min) via a capillary. After filtration of the reaction mixture, the gel was washed with 3×30 ml of distilled water. Titration was used to confirm the average substitution degree, while the presence of ligand gradients is confirmed as below.

Example 2

Negative Gradient Provided in Hexane/Water System (U1282073)

In an alternative solvent system, a separation matrix comprising a density gradient of carboxymethyl (CM) cation-exchange ligands was prepared as follows. A 4 g quantity of bromine activated gel in hexane (0.316 mmol allyl groups/ml drained gel) was filtered and transferred to a reaction vial containing a solution of 3-mercaptopropionic acid (0.07 ml) in water (5 ml) that had been adjusted to pH 11.5 by addition of 2M NaOH (0.8 ml) and 0.5M $Na_2CO_3$ (4 ml). The reaction was left 16 hours under stirring at 40° C. and with a continuous air flow through the mixture (30 ml/min) via a capillary. After filtration of the reaction mixture, the gel was washed with 3×30 ml of distilled water. Titration was used to confirm the average substitution degree, while the presence of ligand gradients is confirmed as below.

Example 3

Positive Gradient Provided in Toluene/Water System (U1282081A)

In this example, a separation matrix comprising a density gradient of carboxymethyl (CM) cation-exchange ligands was prepared as follows. A 5 g quantity of bromine activated gel in toluene (0.316 mmol allyl groups/ml drained gel) was filtered and transferred to a reaction vial containing a solution of thioglycerol (105 μl) in water (10 ml) that had been adjusted to pH 10.5 by addition of 2M NaOH (0.4 ml) and 0.5M $Na_2CO_3$ (4 ml). The reaction was left 16 hours under stirring at 50° C. and with a continuous air flow through the mixture (23 ml/min) via a capillary. After filtration of the reaction mixture the gel was washed with 3×30 ml of distilled water and transferred to a reaction vial containing a solution of 3-mercaptopropionic acid (1.5 ml) in water (5 ml) that had been adjusted to pH 12.5 by addition of a 50% aq. solution of NaOH. The reaction was left 16 hours under stirring at 50° C. After filtration of the reaction mixture, the gel was washed with 3×30 ml of distilled water. Titration was used to confirm the average substitution degree, while the presence of ligand gradients is confirmed as below.

Example 4

Positive Gradient Provided in Hexane/Water System (U1282081B)

In this example, a separation matrix comprising a density gradient of carboxymethyl (CM) cation-exchange ligands was prepared as follows. A 5 g quantity of bromine activated gel in hexane (0.316 mmol allyl groups/ml drained gel) was filtered and transferred to a reaction vial containing a solution of thioglycerol (105 μl) in water (10 ml) that had been adjusted to pH 10.5 by addition of 2M NaOH (0.4 ml) and 0.5M $Na_2CO_3$ (4 ml). The reaction was left 16 hours under stirring at 40° C. and with a continuous air flow through the mixture (46 ml/min) via a capillary. After filtration of the reaction mixture, the gel was washed with 3×30 ml of distilled water and transferred to a reaction vial containing a solution of 3-mercaptopropionic acid (1.5 ml) in water (5 ml) that had been adjusted to pH 12.5 by addition of a 50% aq. solution of NaOH. The reaction was left 16 hours under stirring at 50° C. After filtration of the reaction mixture, the gel was washed with 3×30 ml of distilled water. Titration was used to confirm the average substitution degree, while the presence of ligand gradients is confirmed as below.

C. Gradient Analysis (Examples 1-4)

Confocal Raman Spectroscopy (CRS) was used to evaluate new media prototypes with ligand gradients. The new prototypes were based on SEPHAROSE™ Big Beads (BB) base matrix with carboxymethyl (CM) ligands covalently attached to the matrix. The CM ligands were analysed indirectly by using Neodymium ions ($Nd^{3+}$) ionically attached to the CM ligands at pH 6.8. The $Nd^{3+}$ ions were exited by a laser and the following (strong) fluorescent signal detected within the normal range of Raman scattering. By using CRS, it was possible to analyze ligands in a confocal plane of a bead-shaped support, i.e. in the middle of a bead, and to extract the ligand distribution throughout the particle radius on a micrometer scale (with a depth resolution of ca 5-10 μm).

The results found in this study confirm that it is possible to synthesize ligand gradient chromatography media according to the invention. Ligand gradients directed and hence with a ligand density increasing towards the centre of the support (positive gradient) and ligand gradients directed towards the outer surface of the support and consequently with a ligand density decreasing towards the centre (negative gradient) were synthesized as described above. By using CRS, these ligand gradients could be measured and verified.

Materials

The different prototypes of CM SEPHAROSE™ BB with ligand gradients shown in Table 1 below were analysed.

TABLE 1

Analysed prototypes and their total ionic capacity

| Prototypes | Total ionic capacity (μmol H+/mL gel) | Ligand distribution |
|---|---|---|
| CM SEPHAROSE ™ BB | 120 | Homogenous |
| CM SEPHAROSE ™ BB, U1282072 | 43 | Negative gradient |
| CM SEPHAROSE ™ BB, U1282073 | 16 | Negative gradient |
| CM SEPHAROSE ™ BB, U1282081A | 137 | Positive gradient |
| CM SEPHAROSE ™ BB, U1282081B | 151 | Positive gradient |

Apparatus

A confocal Raman microscope system (Renishaw, model 1000) was used. The Raman system (based on a dispersive grating) was equipped with a near-infrared diode laser with an excitation wavelength of 785 nm, an optical microscope (Leica) and a CCD detector. The optical microscope was equipped with several air objectives (used for wavelength calibration) and one water-immersion type (used for the media measurements).

Methods

Preparation of Beads

About 0.5-1 mL of medium was washed on a glass filter funnel (Duran G3, 15 mL) with an excess of 100 mM Bis Tris Propane buffer solution (pH 6.8) followed by a washing with an excess of 10 mM Bis Tris Propane (BTP) buffer solution (pH 6.8). After dry suction, the medium was transferred to a plastic tube and incubated in an excess of 0.1 M $NdCl_3$ solution (prepared in 10 mM BTP buffer solution pH 6.8) over night (about 16 h in darkness). After incubation, the $NdCl_3$ solution was removed and the medium was washed in the tube with an excess of 10 mM BTP buffer solution (pH 6.8). After 30 minutes, the solution was removed and a new portion was added. This was repeated another two times. Then, a slurry (50:50) was made by adding the latter washing buffer. A small amount of slurry was applied onto a microscope slide and covered by a covering glass. A small drop of distilled water was finally applied onto the covering glass.

Calibration

Before real measurements, the spectrometer wavelength (wave number) scale has to be calibrated. The surface of a silicon wafer was zoomed in visually with the air objective (50×). After switching to laser mode, the laser spot (seen by a video camera) was further focused to a small and bright spot. If needed, the laser spot position was adjusted. Finally, the detector signal area was checked. A spectrum was obtained and the 520 $cm^{-1}$ band was used for calibration. If needed, the scale was adjusted.

Instrumental Parameters, Calibration:

Type: grating (1200 lines/mm), spectrum, static
Range: 800-300 $cm^{-1}$ (centre at 520 $cm^{-1}$), binning=1
Detector: time=1 s, gain=high, pixel (image) area=221-225 (y positions)×2-578 (x positions)
Miscellaneous: accumulation=1, cos.Ray. rem=off, power=100%, objective=50, focus=0%
Laser: wavelength=785 nm, average effect=17 mW
Slit: 10 μm Measurement on Beads The prepared sample was mounted in the microscope and the water-immersion objective (63×) was positioned in the water drop by moving the sample stage upwards. A bead was zoomed in and focused with the microscope to obtain a confocal plane (in focus) in the middle of the bead. The sample stage was moved to set a measurement start point on the x-scale (at the edge of the bead). After switching to laser mode, a spectrum was obtained according to the parameters below. After switching to visual mode, the measurement point was moved vertically to a new position and so forth. After taking a number of spectra along the particle radius, the intensity of the fluorescent signal of $Nd^{3+}$ was evaluated in each spectrum.

Instrumental Parameters, Bead Measurement

Type: grating (1200 lines/mm), spectrum, extended, continuous

Range: 2300-300 $cm^{-1}$, binning=1

Detector: time=10 s, gain=high, pixel (image) area=221-225 (y positions)×2–578 (x positions)

Miscellaneous: accumulation=1, cos.Ray. rem=off, power=100%, obj.=63 (water-immersion), focus=0%

Laser: wavelength=785 nm, average effect=17 mW

Slit: 10 μm

Results and Discussion

In the drawings, the results of ligand distribution in the beads are presented in plots with the intensity of the $Nd^{3+}$ signal versus the lateral position in the bead. FIG. 1 shows a ligand distribution plot of a normal prototype of CM SEPHAROSE™ BB (CDM). The results show that the intensity is almost the same over the entire diameter of the bead, which is expected.

To ensure that no void or blank effects were present, incubation and measurement were firstly done on a porous bead-shaped support without any ligands, i.e. SEPHAROSE™ BB (obtainable from GE Healthcare Bio-Sciences AB, Uppsala, Sweden), with a bead diameter of 190 μm. In FIG. 1, the ligand distribution plot of CM SEPHAROSE™ BB with the intensity of $Nd^{3+}$ versus the radial coordinate in the bead is shown. The washing procedure after incubation with $Nd^{3+}$ ions was effective, and no signal was observed in the beads or in the solution around the beads.

Figure 2:
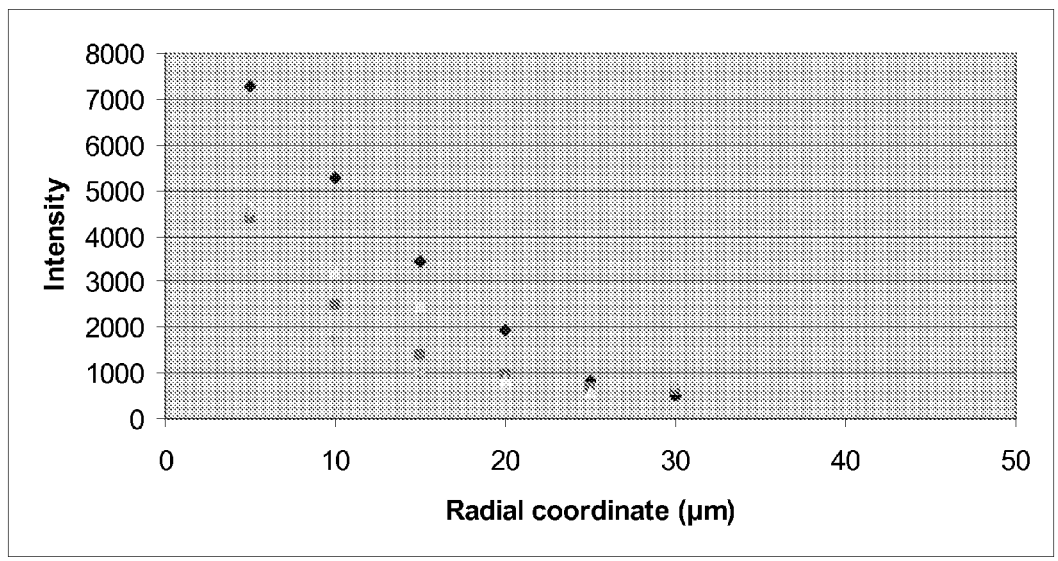
FIG. 2 shows a ligand distribution plot of negative density gradient according to the invention. A change in intensity versus lateral position appears clearly.

The results of Example 1 are shown in FIG. 2, with the intensity of $Nd^{3+}$ versus radial coordinate in the bead(s). The ligand distribution plot shows a change in intensity of $Nd^{3+}$ versus lateral position. The intensity is high at the outer parts of a bead but gradually decreases when going into the middle of the bead, and finally levels off and/or becomes to low to be measured. In this case (and further on), measurements were done only about one radius of the beads.

Figure 3:
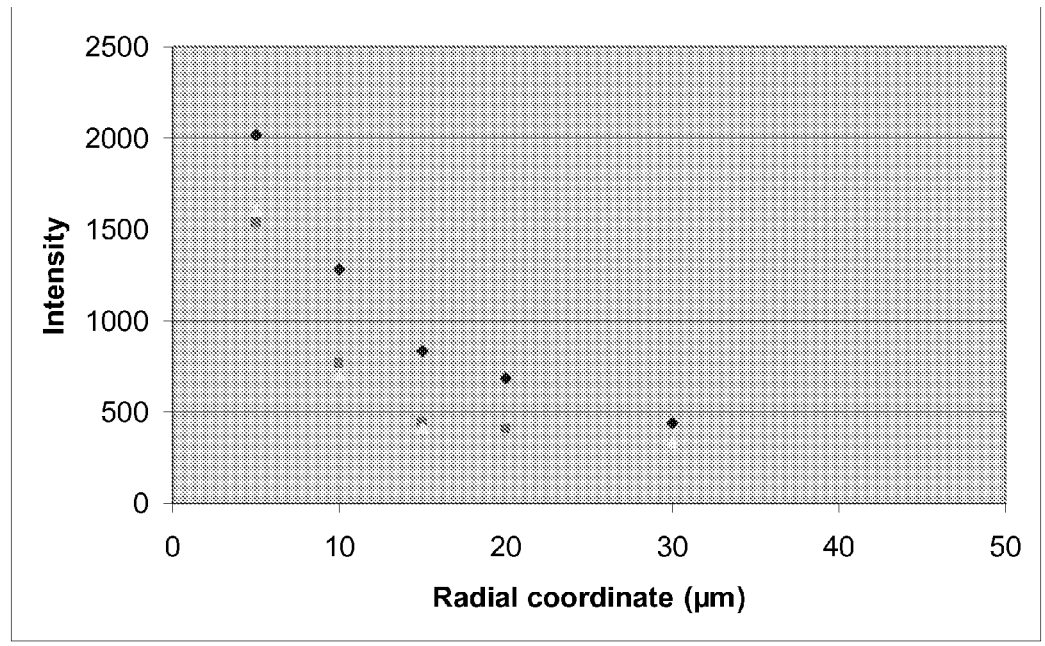
FIG. 3 shows a ligand distribution plot of negative density gradient according to the invention. The shape of the ligand distribution curves was relatively similar to FIG. 2, indicating that different size of the beads can be chosen for measurement.

The results of Example 2 are shown in FIG. 3. The results resemble FIG. 2, but the change in intensity is different in lateral position. For both prototypes, different sizes of beads were analyzed. The shape of the ligand distribution curves was relatively similar indicating that different size of the beads can be chosen for measurement.

Figure 4:
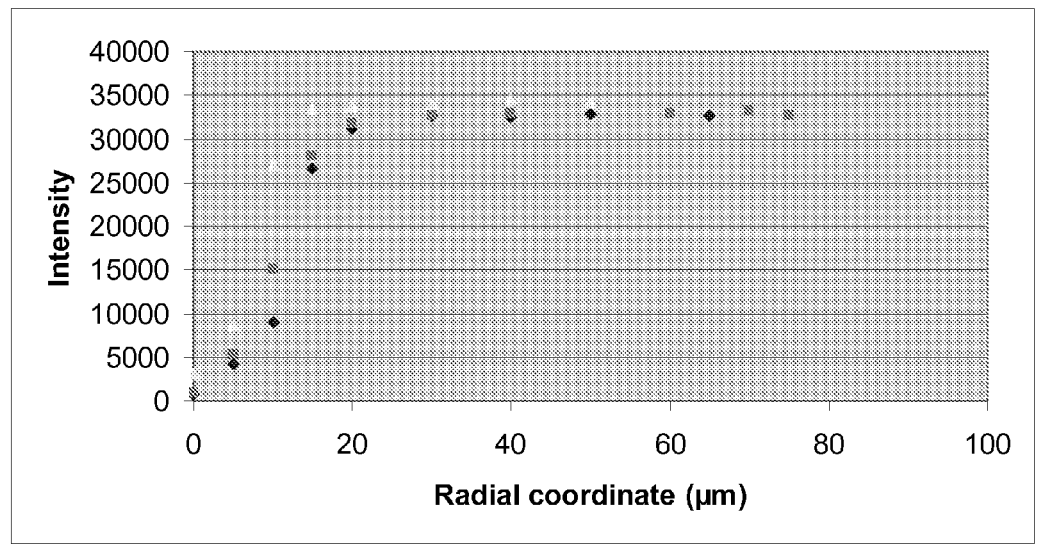
FIG. 4 shows a ligand distribution plot of positive density gradient according to the invention. The prototype in FIG. 4 has a steeper and shorter ligand gradient than FIG. 5 below.
Figure 5:
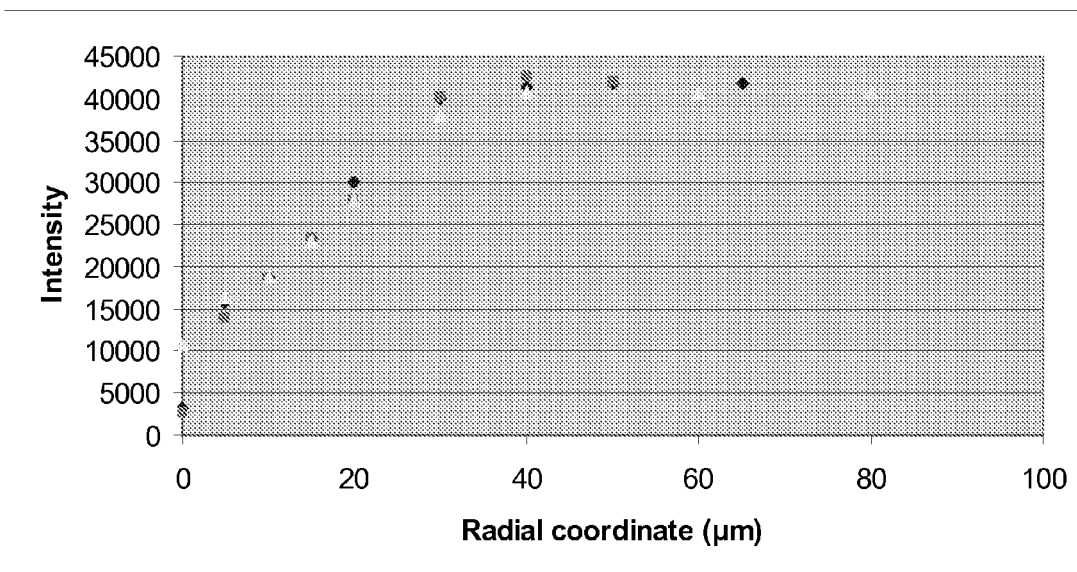
FIG. 5 shows a ligand distribution plot of positive density gradient according to the invention. In this case, the intensity is low at the outer parts of a bead but increases rather rapidly when going into the middle of the bead, and finally levels off.
Figure 6:
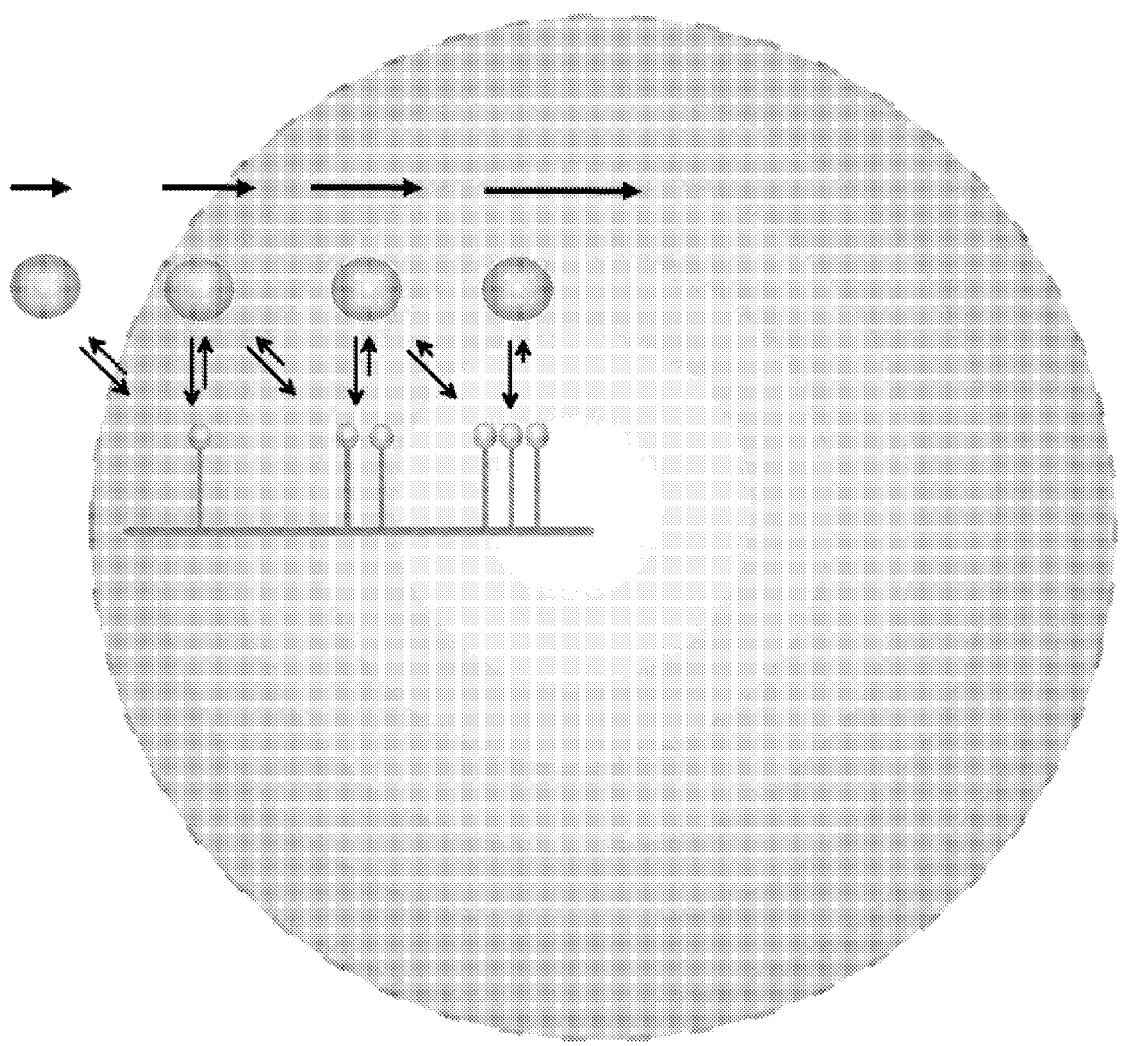
FIG. 6 shows in a schematic way how the adsorption of a target molecule can be facilitated by an increasing ligand density towards the centre of a particulate separation matrix. The drawing is intended to illustrate an embodiment where the functional groups of the ligands are surrounded by a field, such as the field surrounding a charged functionality. The arrows indicate how an increasing force will facilitate the mass transport into the particle.
Figure 7A:
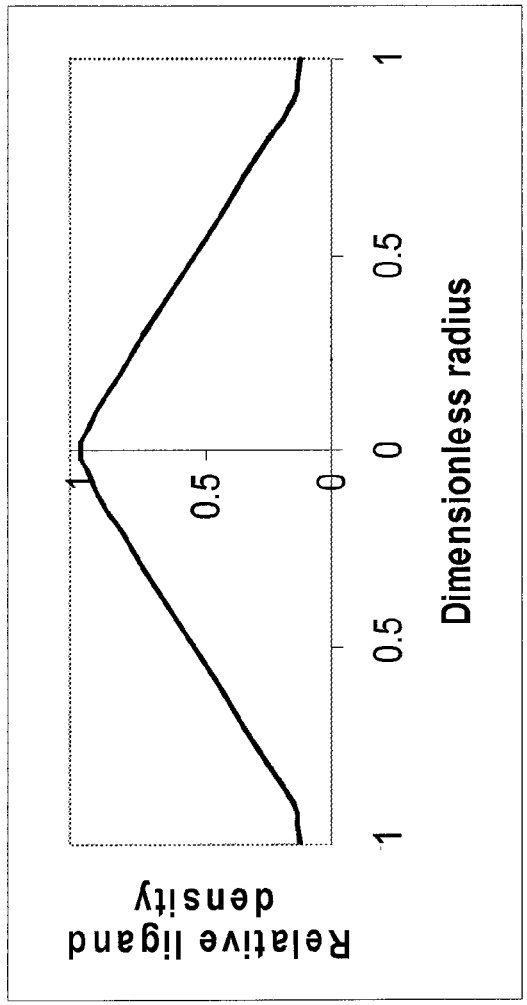
FIG. 7A-H show various illustrative chemical gradients in that can be provided in essentially spherical particles according to the invention. Two ligand kinds are shown, ligand 1 (line) and ligand 2 (broken line). The gradients are shown in diagrams having Relative density on the Y-axis and a dimensionless radius on the X-axis.
Figure 7B:
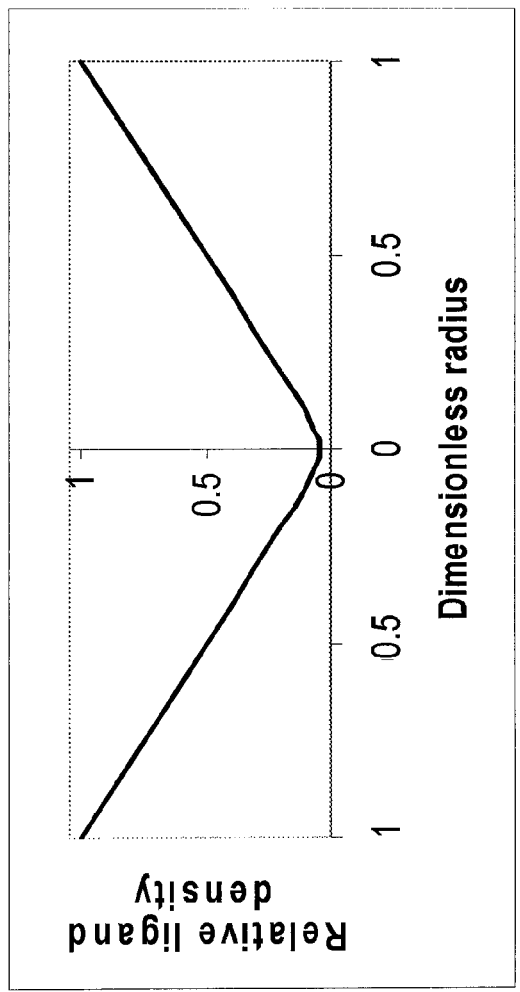
Figure 7:
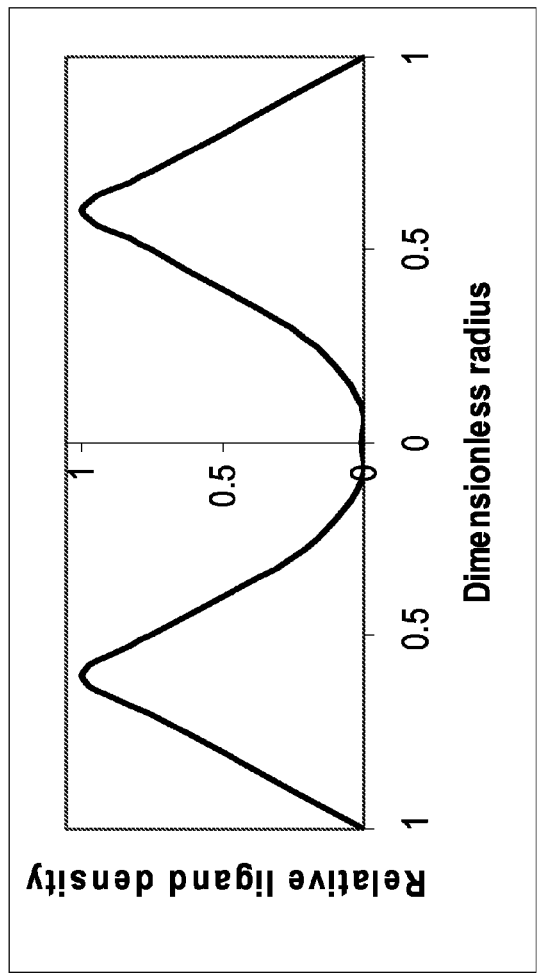
Figure 7:
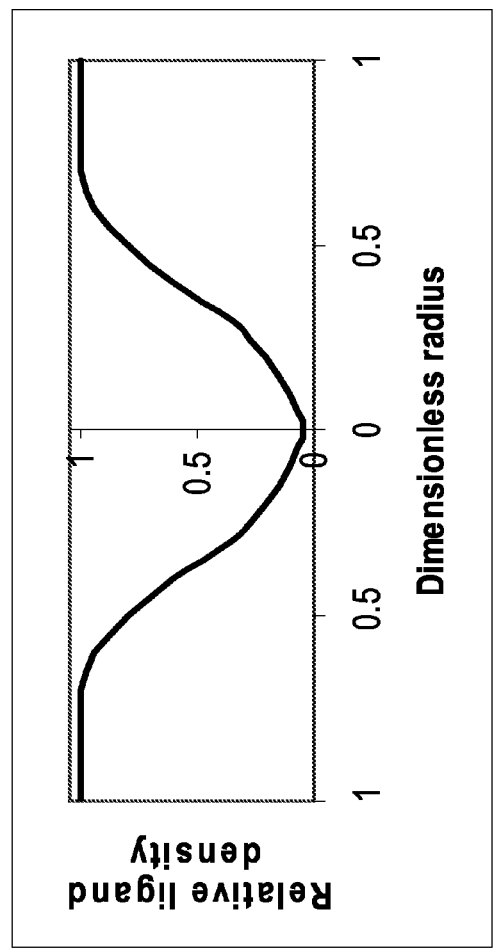
Figure 7E:
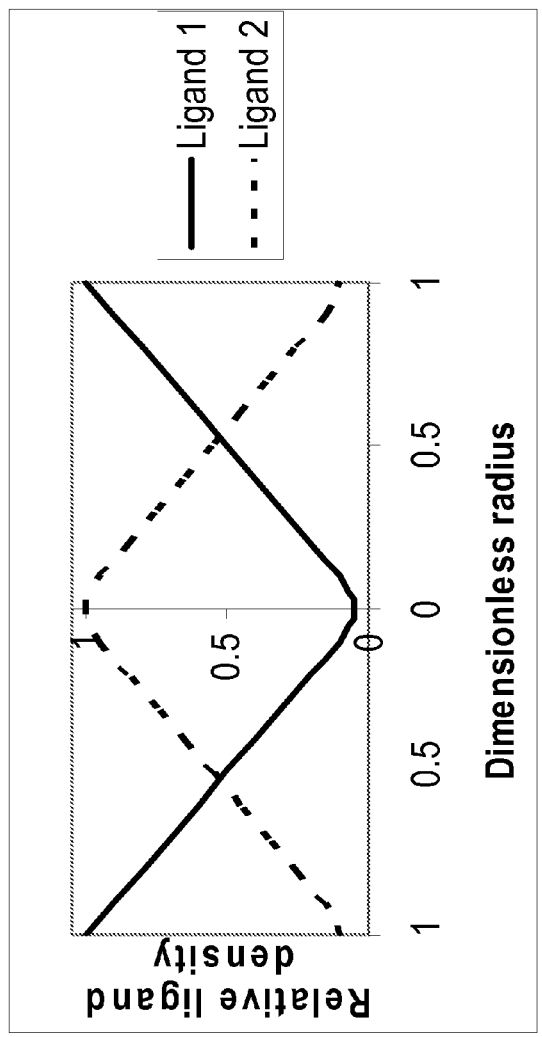
Figure 7F:
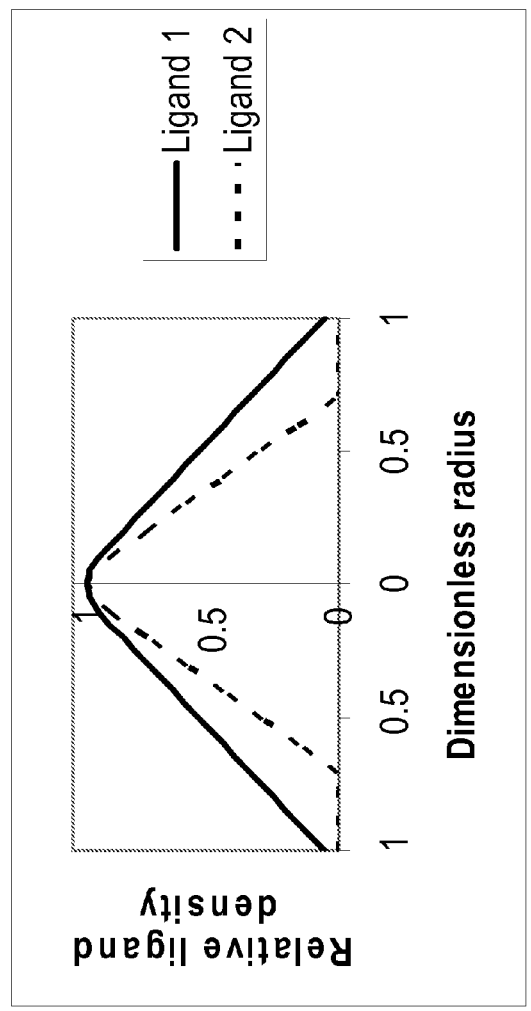
Figure 7:
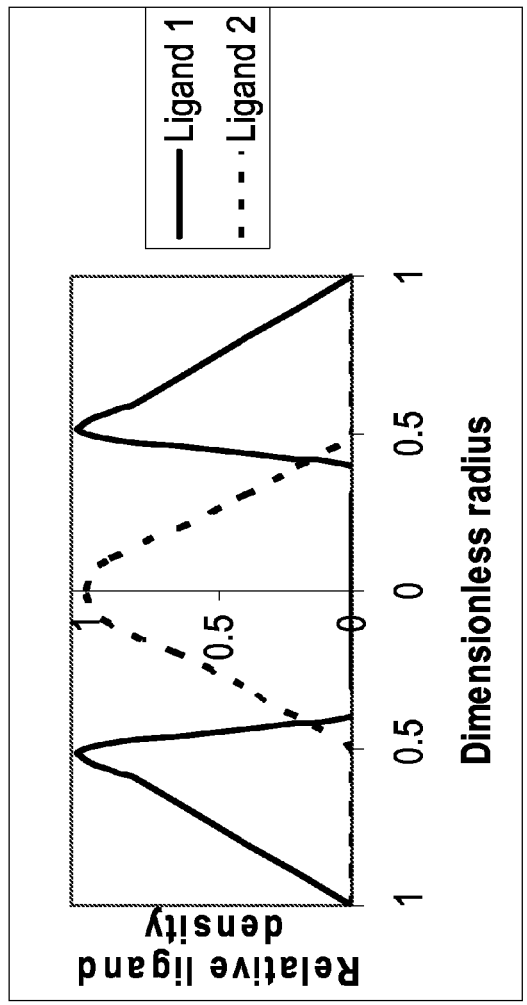
Figure 7:
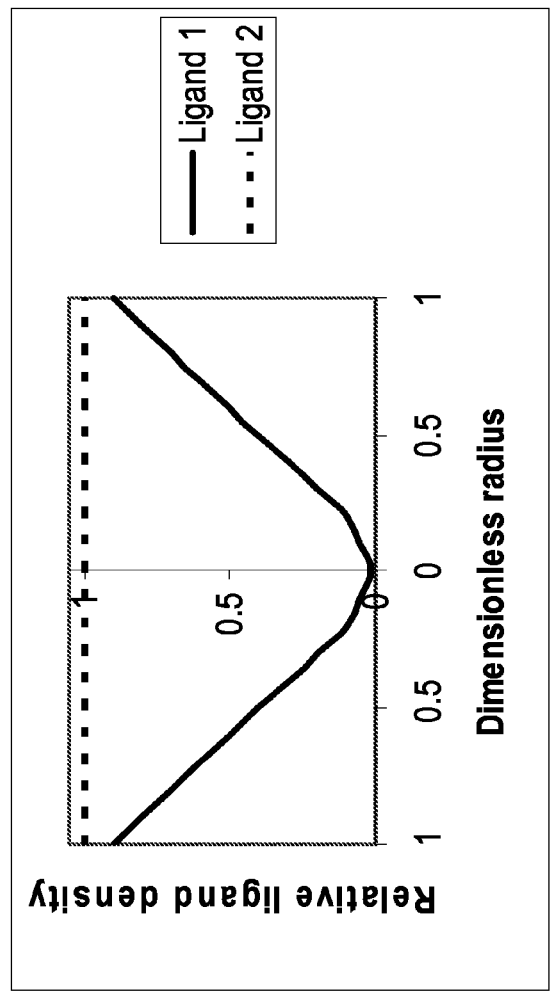

The results of Examples 3 and 4 (positive gradients) are shown in FIGS. 4 and 5, respectively. In this case, the intensity is low at the outer parts of a bead but increases rather rapidly when going into the middle of the bead, and finally levels off. The prototype in FIG. 4 has a steeper and shorter ligand gradient. As above, the bead size had no effect on the results.

Conclusion

In this study, it was shown that it is possible to synthesise ligand gradient separation matrices according to the invention. Both increasing and decreasing ligand gradients have successfully been synthesised. By using CRS, these ligand gradients could be measured and verified.

Example 5

Negative Gradient of Ion-exchange Ligands

Cation Exchange Media

The carboxylic groups were introduced on the matrix with thiol-containing derivatives, but derivatives containing other reactive nucleophilic groups can as well be used.

Gradients of Immobilised 3-mercaptopropionic Acid:

Bromine was added to a stirred suspension of 100 ml of allyl activated SEPHAROSE™ 6 FF (0.3 mmol of allyl/ml), 4 g of AcONa and 100 ml of distilled water, till a persistent yellow colour was obtained. Sodium formate was then added till the suspension was fully decolourised.

The reaction mixture was filtered and the gel washed with 500 ml of distilled water. The activated gel was then directly transferred to 4 distinct reaction vessels:

A) 20 ml of activated gel was treated with, an aqueous solution (10 ml dist.water) of 366 μl of thiopropionic acid (0.7 equivalents per allyl group) and 2.4 g of NaCl which pH was adjusted to 11.5 with 50% aq. NaOH before the addition.

The reaction was left 10 hours under stirring at 70° C. Filtration of the reaction mixture and washing with 100 ml of distilled water gave the thiopropionic SEPHAROSE™ derived gel.

B) 20 ml of activated gel was treated with, an aqueous solution (10 ml dist.water) of 366 μl of thiopropionic acid (0.7 equivalents per allyl group) and 2.4 g of NaCl which pH was adjusted to 11.5 with 50% aq. NaOH before the addition.

The reaction was left 10 hours under stirring at 30° C. Filtration of the reaction mixture and washing with 100 ml of distilled water gave the thiopropionic SEPHAROSE™ derived gel.

C) 20 ml of activated gel was treated with, an aqueous solution (10 ml dist.water) of 262 μl of thiopropionic acid (0.5 equivalents per allyl group) and 2.4 g of NaCl which pH was adjusted to 11.5 with 50% aq. NaOH before the addition.

The reaction was left 10 hours under stirring at 70° C. Filtration of the reaction mixture and washing with 100 ml of distilled water gave the thiopropionic SEPHAROSE™ derived gel.

D) 20 ml of activated gel was treated with, an aqueous solution (10 ml dist.water) of 262 μl of thiopropionic acid (0.5 equivalents per allyl group) and 2.4 g of NaCl which pH was adjusted to 11.5 with 50% aq. NaOH before the addition.

The reaction was left 10 hours under stirring at 30° C. Filtration of the reaction mixture and washing with 100 ml of distilled water gave the thiopropionic SEPHAROSE™ derived gel.

Anion Exchange Media

In a typical procedure, the anion exchanger groups were introduced on the matrix directly by immobilisation of a tertiary amine, but ligands containing other reactive nucleophilic groups and can as well be used as long as they also present an anion exchanger group or the possibility to generate one.

Gradients of Immobilised Trimethylamine:

Bromine was added to a stirred suspension of 100 ml of allyl activated SEPHAROSE™ 6 FF (0.3 mmol of allyl/ml), 4 g of AcONa and 100 ml of distilled water, till a persistent yellow colour was obtained. Sodium formate was then added till the suspension was fully decolourised.

The reaction mixture was filtered and the gel washed with 500 ml of distilled water. The activated gel was then directly transfer to 4 distinct reaction vessels:

A) 20 ml of drained brominated gel was charged in to a 100 ml three necked round flask provided with a propeller stirrer together with 8 ml water. A 50/50 solution of sodium hydroxide in water, prepared from 14.9 g NaOH and 0.01 g NaBH4 in 14.9 g water, was added drop by drop. An aqueous solution (2 ml) of 0.4 g trimethyl ammonium chloride (0.7 equivalents per allyl group) was then added.
Reaction was run under stirring at 50° C. for 5 hours.
The reaction was terminated by washing the gel on a glass filter funnel with 400 mL water, 80 ml 1M Sodium chloride and another 400 mL of water.

B) 20 ml of drained brominated gel was charged in to a 100 ml three necked round flask provided with a propeller stirrer together with 8 ml water and a 50/50 solution of sodium hydroxide in water, prepared from 14.9 g NaOH and 0.01 g NaBH4 in 14.9 g water, was added drop by drop. An aqueous solution (2 ml) of 0.4 g trimethyl ammonium chloride (0.7 equivalents per allyl group) was then added.
Reaction was run under stirring at 20° C. for 5 hours.
The reaction was terminated by washing the gel on a glass filter funnel with 400 mL water, 80 ml 1M Sodium chloride and another 400 mL of water.

C) 20 ml of drained brominated gel was charged in to a 100 ml three necked round flask provided with a propeller stirrer together with 8 ml water and a 50/50 solution of sodium hydroxide in water, prepared from 14.9 g NaOH and 0.01 g NaBH4 in 14.9 g water, was added drop by drop. An aqueous solution (2 ml) of 0.286 g trimethyl ammonium chloride (0.5 equivalents per allyl group) was then added.
Reaction was run under stirring at 50° C. for 5 hours.
The reaction was terminated by washing the gel on a glass filter funnel with 400 mL water, 80 ml 1M Sodium chloride and another 400 mL of water.

D) 20 ml of drained brominated gel was charged in to a 100 ml three necked round flask provided with a propeller stirrer together with 8 ml water and a 50/50 solution of sodium hydroxide in water, prepared from 14.9 g NaOH and 0.01 g NaBH4 in 14.9 g water, was added drop by drop. An aqueous solution (2 ml) of 0.286 g trimethyl ammonium chloride (0.5 equivalents per allyl group) was then added.
Reaction was run under stirring at 20° C. for 5 hours.
The reaction was terminated by washing the gel on a glass filter funnel with 400 mL water, 80 ml 1M Sodium chloride and another 400 mL of water.

Example 6

Positive Gradient of Ion-exchange Ligands

The increasing gradient was realised by first creating a decreasing gradient of a neutral ligand and the resulting gel was further derivatised on the remaining active groups by the chromatographically active ligand.
Cation Exchange Media
Gradients of Immobilised 3-mercaptopropionic Acid and 3-mercapto-1,2-propanediol:
Bromine was added to a stirred suspension of 100 ml of allyl activated SEPHAROSE™ 6 FF (0.3 mmol of allyl/ml), 4 g of AcONa and 100 ml of distilled water, till a persistent yellow colour was obtained. Sodium formate was then added till the suspension was fully decolourised.
The reaction mixture was filtered and the gel washed with 500 ml of distilled water. The activated gel was then directly transfer to 4 distinct reaction vessels:

A) 20 ml of activated gel was treated with, an aqueous solution (10 ml dist.water) of 251 μl of 3-mercapto-1,2-propanediol (0.5 equivalents per allyl group) and 2.4 g of NaCl which pH was adjusted to 11.5 with 50% aq. NaOH before the addition.
The reaction was left 1 hour under stirring at 50° C. After 1 hour the reaction was treated with an aqueous solution (5 ml dist.water) of 1.6 ml of thiopropionic acid (3 equivalents per allyl group) and 2.4 g of NaCl which pH was adjusted to 11.5 with 50% aq. NaOH before the addition. The reaction was then left 18 hours at 50° C.
Filtration of the reaction mixture and washing with 100 ml of distilled water gave the thiopropionic SEPHAROSE™ derived gel.

B) 20 ml of activated gel was treated with, an aqueous solution (10 ml dist.water) of 251 μl of 3-mercapto-1,2-propanediol (0.5 equivalents per allyl group) and 2.4 g of NaCl which pH was adjusted to 11.5 with 50% aq. NaOH before the addition.
The reaction was left 1 hour under stirring at 20° C. After 1 hour the reaction was treated with an aqueous solution (5 ml dist.water) of 1.6 ml of thiopropionic acid (3 equivalents per allyl group) and 2.4 g of NaCl which pH was adjusted to 11.5 with 50% aq. NaOH before the addition. The reaction was then left 18 hours at 50° C.
Filtration of the reaction mixture and washing with 100 ml of distilled water gave the thiopropionic SEPHAROSE™ derived gel.

C) 20 ml of activated gel was treated with, an aqueous solution (10 ml dist.water) of 151 μl of 3-mercapto-1,2-propanediol (0.3 equivalents per allyl group) and 2.4 g of NaCl which pH was adjusted to 11.5 with 50% aq. NaOH before the addition.
The reaction was left 1 hour under stirring at 50° C. After 1 hour the reaction was treated with an aqueous solution (5 ml dist.water) of 1.6 ml of thiopropionic acid (3 equivalents per allyl group) and 2.4 g of NaCl which pH was adjusted to 11.5 with 50% aq. NaOH before the addition. The reaction was then left 18 hours at 50° C.
Filtration of the reaction mixture and washing with 100 ml of distilled water gave the thiopropionic SEPHAROSE™ derived gel.

D) 20 ml of activated gel was treated with, an aqueous solution (10 ml dist.water) of 151 μl of 3-mercapto-1,2-propanediol (0.3 equivalents per allyl group) and 2.4 g of NaCl which pH was adjusted to 11.5 with 50% aq. NaOH before the addition.
The reaction was left 1 hour under stirring at 20° C. After 1 hour the reaction was treated with an aqueous solution (5 ml dist.water) of 1.6 ml of thiopropionic acid (3 equivalents per allyl group) and 2.4 g of NaCl which pH was adjusted to 11.5 with 50% aq. NaOH before the addition. The reaction was then left 18 hours at 50° C.
Filtration of the reaction mixture and washing with 100 ml of distilled water gave the thiopropionic SEPHAROSE™ derived gel.

Anion Exchange Media
Gradients of Immobilised Trimethylamine and 3-mercapto-1,2-propanediol:
Bromine was added to a stirred suspension of 100 ml of allyl activated SEPHAROSE™ 6 FF (0.3 mmol of allyl/ml), 4 g of AcONa and 100 ml of distilled water, till a persistent yellow colour was obtained. Sodium formate was then added till the suspension was fully decolourised.
The reaction mixture was filtered and the gel washed with 500 ml of distilled water. The activated gel was then directly transfer to 4 distinct reaction vessels:

A) 20 ml of activated gel was treated with, an aqueous solution (10 ml dist.water) of 251 μl of 3-mercapto-1,2-propanediol (0.5 equivalents per allyl group) and 2.4 g of NaCl, which pH was adjusted to 11.5 with 50% aq. NaOH before the addition.

The reaction was left 1 hour under stirring at 50° C. After 1 hour the reaction was treated with an aqueous solution (5 ml dist.water) of 2.86 g of trimethylammonium chloride (5 equivalents per allyl group) and 2.4 g of NaCl which pH was adjusted to 11.5 with 50% aq. NaOH before the addition. The reaction was then left 18 hours at 50° C. The reaction was terminated by washing the gel on a glass filter funnel with 400 mL water, 80 ml 1M Sodium chloride and another 400 mL of water.

B) 20 ml of activated gel was treated with, an aqueous solution (10 ml dist.water) of 251 μl of 3-mercapto-1,2-propanediol (0.5 equivalents per allyl group) and 2.4 g of NaCl which pH was adjusted to 11.5 with 50% aq. NaOH before the addition.

The reaction was left 1 hour under stirring at 20° C. After 1 hour the reaction was treated with an aqueous solution (5 ml dist.water) of 2.86 g of trimethylammonium chloride (5 equivalents per allyl group) and 2.4 g of NaCl which pH was adjusted to 11.5 with 50% aq. NaOH before the addition. The reaction was then left 18 hours at 50° C.

The reaction was terminated by washing the gel on a glass filter funnel with 400 mL water, 80 ml 1M Sodium chloride and another 400 mL of water.

C) 20 ml of activated gel was treated with, an aqueous solution (10 ml dist.water) of 151 μl of 3-mercapto-1,2-propanediol (0.3 equivalents per allyl group) and 2.4 g of NaCl which pH was adjusted to 11.5 with 50% aq. NaOH before the addition.

The reaction was left 1 hour under stirring at 50° C. After 1 hour the reaction was treated with an aqueous solution (5 ml dist.water) of 2.86 g of trimethylammonium chloride (5 equivalents per allyl group) and 2.4 g of NaCl which pH was adjusted to 11.5 with 50% aq. NaOH before the addition. The reaction was then left 18 hours at 50° C.

The reaction was terminated by washing the gel on a glass filter funnel with 400 mL water, 80 ml 1M Sodium chloride and another 400 mL of water.

D) 20 ml of activated gel was treated with, an aqueous solution (10 ml dist.water) of 151 μl of 3-mercapto-1,2-propanediol (0.3 equivalents per allyl group) and 2.4 g of NaCl which pH was adjusted to 11.5 with 50% aq. NaOH before the addition.

The reaction was left 1 hour under stirring at 20° C. After 1 hour the reaction was treated with an aqueous solution (5 ml dist.water) of 2.86 g of trimethylammonium chloride (5 equivalents per allyl group) and 2.4 g of NaCl which pH was adjusted to 11.5 with 50% aq. NaOH before the addition. The reaction was then left 18 hours at 50° C. The reaction was terminated by washing the gel on a glass filter funnel with 400 mL water, 80 ml 1M Sodium chloride and another 400 mL of water.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. In a method of providing a separation matrix comprising ligands coupled to the surfaces of a porous support;
    the method comprising providing the porous support comprising porous particles; and coupling ligands to the surface of said porous support, wherein the ligands provide at least one ligand density gradient in the support, further wherein the ligand density gradient(s) extend between the center and the exterior surface of each porous particle;
    the improvement comprises providing said at least one ligand density gradient by solvent-controlled diffusion of at least one reagent into the porous support, wherein the solvent-controlled diffusion is obtained by contacting a first solvent comprising said reagent(s) with the support, in the pores of which a second solvent is present, said first and second solvents presenting different solubilities wherein the support presents activated groups; and,
    wherein a ligand density gradient that increases or decreases towards the center of the support is provided by diffusion-controlled addition to the porous support of a first reagent, which comprises deactivating groups, to deactivate in a controlled fashion some of the surface groups of the support, and subsequent addition of another reagent, which comprises at least one functionality, to couple said at least one functionality to the surface groups that have not been deactivated.

2. The method of claim 1, wherein the first solvent is aqueous and the second solvent is organic.

3. The method of claim 1, wherein the first solvent is organic and the second solvent is aqueous.

4. The method of claim 1, wherein the diffusion rate is controlled by adjusting one or more conditions selected from the group consisting of temperature; air flow; solvent properties; and concentration and/or nature of functionalities.

5. The method of claim 4, wherein the diffusion of reagent(s) is assisted by providing an essentially continuous air flow through the reaction mixture during the reaction.

6. The method of claim 1, wherein the reagent comprises two different functionalities in a predetermined ratio to provide to different ligands in the separation matrix.

7. The method of claim 1, wherein the porous support comprises essentially spherical particles.

* * * * *